US008497656B2

(12) United States Patent  (10) Patent No.: US 8,497,656 B2
Portis, Jr. et al.  (45) Date of Patent: Jul. 30, 2013

(54) SOLAR POWERED UMBRELLA TABLE

(76) Inventors: Matthew N Portis, Jr., Alexandria, VA (US); Obadiah Hampton, Maricopa, AZ (US)

( * ) Notice: Subject to any disclaimer, the term of this patent is extended or adjusted under 35 U.S.C. 154(b) by 377 days.

(21) Appl. No.: 12/769,326

(22) Filed: Apr. 28, 2010

(65) Prior Publication Data

US 2011/0265694 A1  Nov. 3, 2011

(51) Int. Cl.
*H01M 10/44* (2006.01)
*H01L 25/00* (2006.01)
*H02N 6/00* (2006.01)

(52) U.S. Cl.
USPC ........... 320/101; 136/243; 136/244; 136/245; 136/251; 136/252

(58) Field of Classification Search
CPC ........................................... H02J 7/35
USPC ....................................... 320/101
See application file for complete search history.

(56) References Cited

U.S. PATENT DOCUMENTS

| | | |
|---|---|---|
| 6,017,188 A | 1/2000 | Benton |
| 6,612,713 B1 | 9/2003 | Kuelbs |
| 2004/0031513 A1 | 2/2004 | Bunch et al. |
| 2004/0228118 A1* | 11/2004 | Peterson ............... 362/102 |
| 2006/0188616 A1* | 8/2006 | Pierce et al. ............ 426/231 |
| 2007/0242450 A1 | 10/2007 | Blatecky |
| 2007/0283987 A1* | 12/2007 | Reyes et al. ............ 135/16 |
| 2008/0092936 A1 | 4/2008 | Carabillo |
| 2009/0058354 A1* | 3/2009 | Harrison ............... 320/101 |
| 2009/0251887 A1 | 10/2009 | Chronopoulos |
| 2010/0116325 A1* | 5/2010 | Nikoonahad ............ 136/251 |
| 2011/0088741 A1* | 4/2011 | Dunton et al. ........... 136/244 |

FOREIGN PATENT DOCUMENTS

CN 201332756 * 10/2009

* cited by examiner

*Primary Examiner* — Edward Tso
*Assistant Examiner* — Ahmed Omar
(74) *Attorney, Agent, or Firm* — The Law Firm of Andrea Hence Evans, LLC

(57) ABSTRACT

A solar umbrella and table apparatus with attached chairs features stand-alone AC power, generated from solar energy. The apparatus features an umbrella having solar collection devices and a table with attached seating chairs. The electrical system of the apparatus converts collected solar energy to an electrical voltage. Batteries store the energy provided by the solar panels. Inverters convert the DC voltage output from the storage batteries to 120 volts AC. Power outlet terminals are located on the umbrella and table apparatus allow 120 volts AC powered devices to access the output of the sine wave power inverters.

11 Claims, 3 Drawing Sheets

SOLAR POWERED UMBRELLA TABLE

FIELD OF THE INVENTION

The present invention relates in general to a table having an umbrella with an integrated solar power supply.

BACKGROUND OF THE INVENTION

Tables with umbrellas are commonly used for outdoor entertaining and dining. Objects are placed on the tables that require a power source. However, external power sources present a problem because having cords run from the table to the external power source take up unnecessary space and the cords create a safety hazard. Also, if the tables are placed too far from the external power source, the object's cord will not reach the external power source. The external power source may also be impossible to use because of its remote location making it not readily accessible. During nighttime hours, it is difficult to see the external power source.

Owners of tables with umbrellas shy away from allowing users to use their external power source due to the problems discussed and added liability. Also, owners are not willing to take on the added expense of paying for the cost of the additional electricity. Vendors are losing customers because customers are in search of an vendor that provides an outdoor environment with the power source capabilities so they can use their electrical objects such as computers or cell phones, for example without worrying that they will not be able to keep the batteries of the objects charged.

SUMMARY OF THE INVENTION

This invention introduces a table and umbrella apparatus and method which do not require access to a conventional AC wall outlet. The apparatus and method of the present invention provides an umbrella having at least one solar energy collection device that converts solar energy to an electrical DC voltage. A base station houses a battery that stores the DC voltage and an inverter that coverts the DC voltage to AC voltage. A power outlet terminal on the apparatus receives the AC voltage so that an electrical device may be plugged into the terminal for power.

An aspect of an embodiment of the invention provides electricity to external electrical devices from solar energy collected from solar energy collection devices located on the umbrella.

A further aspect of an embodiment of the invention provides a moisture detector that senses unsafe levels of moisture in the apparatus.

A further aspect of an embodiment of the invention provides an emergency power switch that can disconnect the inverter of the apparatus and method in the event of an emergency.

Additional aspects, objectives, features and advantages of the present invention will become apparent from the following description of the preferred embodiments with reference to the attached drawings.

DETAILED DESCRIPTION OF THE INVENTION

Figure 1:
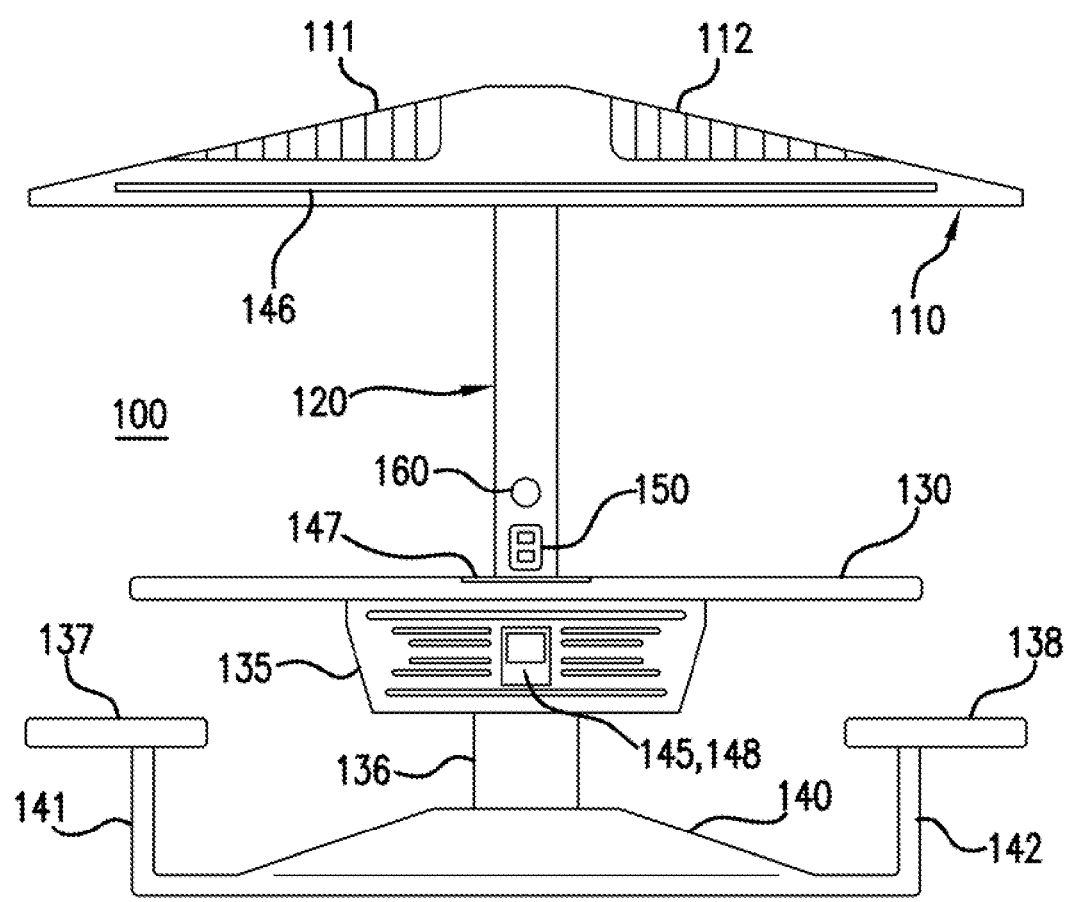
FIG. 1 is a perspective view of the table and umbrella apparatus.
Figure 2:
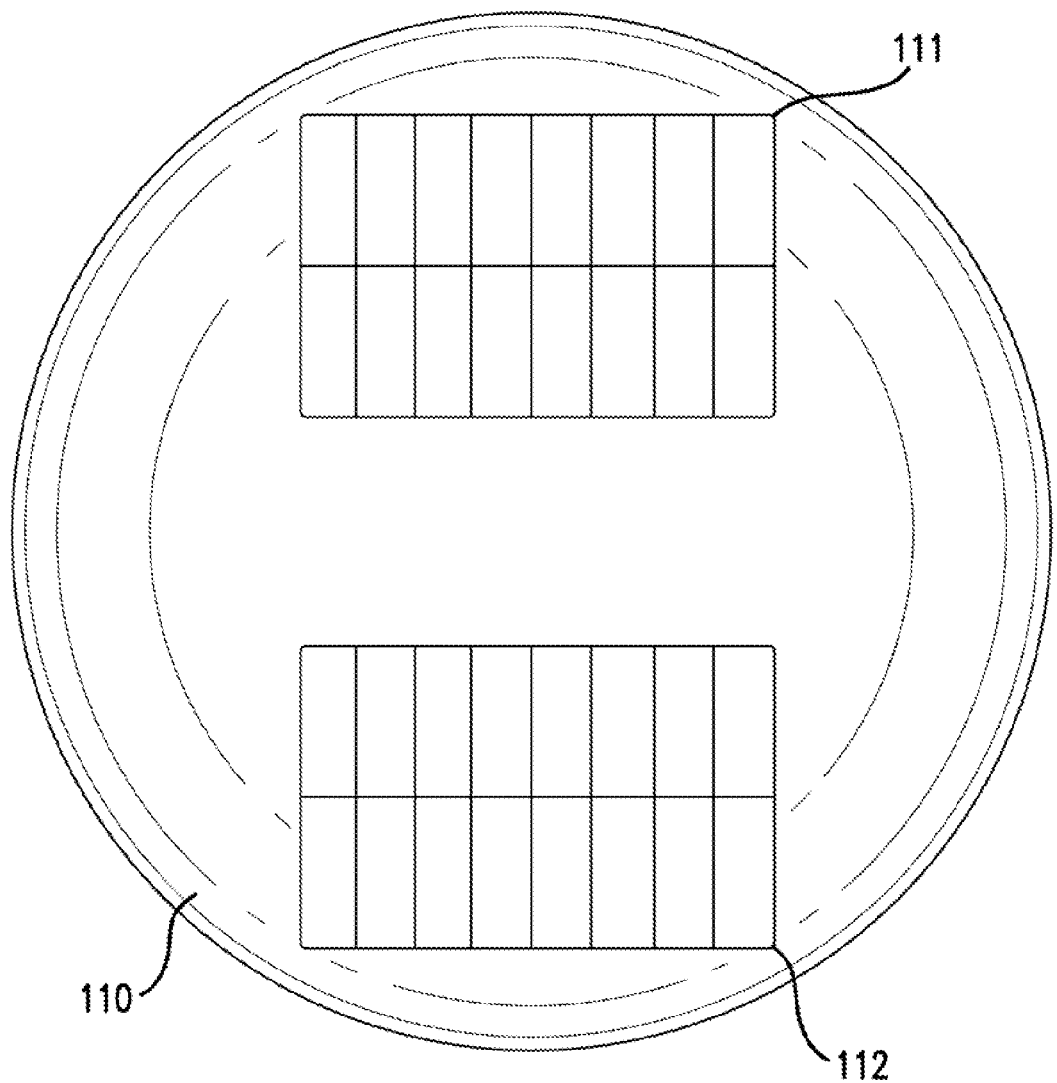
FIG. 2 is a top view of the umbrella.

Referring to the figures, FIG. 1 is a perspective view of the table and umbrella apparatus 100. The apparatus 100 comprises an umbrella 110 having at least one solar energy collection device 111, 112 that converts solar energy to an electrical DC voltage. The umbrella is preferably a fiber glass material. However, various types of materials may be used so long as they are strong enough to support the panels 111, 112 and so long as the panels 111,112 are not able to cut through the material. An aspect of an embodiment of the invention features solar panels as the solar energy collection devices. Two solar panels 111, 112 are shown in FIG. 1 and FIG. 2, however it is understood that additional solar panels can be used or that one solar panel can be used to collect solar energy. FIG. 2 is a top view of the umbrella 110. The solar panels 111, 112 are spaced and positioned for the optimal exposure to the sun. The solar panels are groups of solar cells in the form of a panel designed to absorb the sun's rays as a source of energy for generating electricity. The panels 111, 112 are positioned on the umbrella to receive maximum and direct exposure to the sun. The panels 111, 112 are mounted on the top surface of the umbrella 110 in a manner such that they are adjustable and can be angled or positioned for maximum sun exposure.

The umbrella 110 features a pole 120 that supports the umbrella 110. The pole 120 extends in a downward direction from underneath the umbrella 110. The pole 120 is located in the center of the umbrella 100. The pole 120 is fitted through the top surface of the table 130, the table base station 135 through the seat base 140. The connected umbrella 110 and pole 120 are connected to the table 130 in a manner such that the umbrella 110 and pole 120 can withstand weather and movement without damaging the apparatus 100. The base station 135 is connected to a bottom portion of the table 130. Connecting wires will run from the solar panels 111,112 attached on the top of the umbrella 110 through the pole 120 and through the center hole of the table 130 into a sealed electrical charging/storage base station 135. Connections will run from the charging base station 135 to the AC/DC plug 150.

Figure 3:
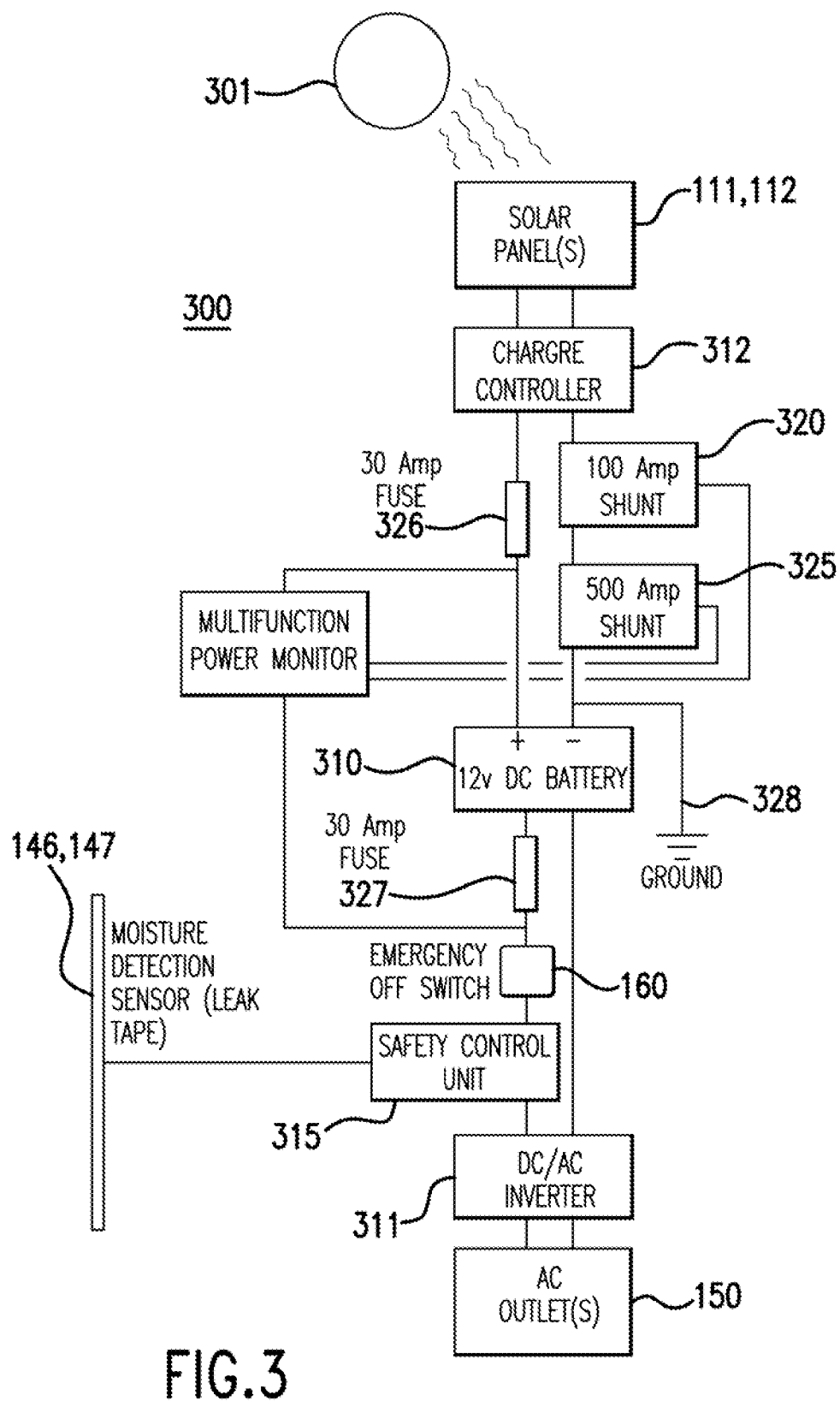
FIG. 3 is a schematic of the electrical system of the table and umbrella apparatus.

The base station 135 houses the electrical and electronic components 300 shown in FIG. 3. The station 135 houses at least one battery 310 that stores the electrical DC voltage and at least one inverter 311 that converts the DC voltage to AC voltage. The battery 310 is a rechargeable storage battery 12 volt 78 amp/hour. The umbrella and table apparatus 100 may be used anytime, day or night, whether sunny or cloudy. The base station also houses a battery charge controller 312 that ensures the battery 310 is continuously charging. The base station 135 is centered. The pole base 136 extends beneath the base station 135 and is secured onto the seat base 140. The pole base 136 diameter is larger than the pole 120 diameter. The pole base 136 provides additional support for the connected umbrella 110, pole 120 and base station 135. The seat base 140 is a one-piece structure that also features seats 137, 138. The center of the seat base 140 is aligned with the center of the umbrella 110, pole 120, and center of the base station 135. Seat base legs 141, 142 extend outward from base 140 and the seats 137, 138 are secured to the legs 141, 142, respectively. The seat base 140 features are symmetrical.

At least one power outlet terminal 150 is located on the pole 120. The outlet terminal 150 is adapted to receive the AC voltage such that an electrical device may be plugged into the power outlet terminal 150. The terminal 150 is engineered to maintain a constant charge through the fixed wires to a charging box and solar panel. It is understood that multiple outlet terminals may be featured along the pole to power multiple electrical outlets. Furthermore, the location of the terminals may be such that they are located at different heights in relation to the table.

A power meter display 145 is located on the base station 135. The power meter display 145 displays the solar energy collection device 111,112 charging current, or a state of a current charge, or a rate of the current charge or a current discharge. The display 145 may be a LED or LCD display. These functions are controlled by a charge controller in conjunction with the multifunction power meter. Moisture detection sensor 146 is located on the top portion of the umbrella 110. Moisture detection sensor 147 is also located on a top portion of the table 130, just below the point where the pole 120 meets the table 130. The sensors 146, 147 are located on both sides of the umbrella 110 and table 130. The detection sensors 146, 147 detect a moisture level of the apparatus. The sensors 146 and 147 are leak tape which is an adhesive tape with flat copper or stainless steel conductors. The tape 146, 147 detects moisture and leaks over a contiguous region. The apparatus 100 features a safety control unit 315. The unit 315 is connected to the system such that the inverter 311 will disconnect from the apparatus 100 if the moisture level detected by the moisture detection sensors 146, 147 is an unsafe level. For example, if the tape on the umbrella detects a large amount of water such as a downpour, the system will disable. Similarly, if a liquid is detected on the surface of the table, the system will disable. The liquid leak detection sensors which are installed on the umbrella top surface, table top surface near the center, and inside the base station will communicate to the safety control unit. In the case that liquid is detected on any part of any of the sensors, a signal is sent to the control unit. The control unit will then stop the flow of current from the battery to the inverter. The safety control unit 315 is designed to automatically disable the system in the event of an emergency situation. However, an emergency power switch 160 located on the pole 120 and interconnected to the battery 310 can disconnect the inverter 311 from the apparatus 100 in the event of an emergency. The emergency power switch 160 can be moved into the off position manually. In the event of an emergency, if the emergency power switch 160 is pressed or if the leak sensor tape 146, 147 detects an unsafe level of moisture, the voltage current flow from the power inverters 311 to the AC outlets 150 will immediately disconnect causing a power break in the output flow from the battery charge controllers 312 to the storage batteries 310. The circuit can only be restored if all the leak tape 146, 147 is dry and the emergency button 160 is reset.

FIG. 3 is a schematic of the electrical system 300 of the table and umbrella apparatus 100. The system 300 provides power to an electrical device having an AC plug. The electrical system 300 is housed in the base station 135. A panel on the base station 135 can be removed to repair the system, if necessary. In use, the solar collection devices 111, 112 collect energy from the sun 301 and convert the energy into an electrical voltage. The battery charge controllers 312 maintain the proper charging voltage for the batteries 310. The batteries 310 store the energy provided by the solar panels 111,112. The solar panels 111, 112 supply energy which is regulated by the batter charge controller 312 to the 12 v deep cycle battery which sends 12 volts DC to a power inverter 311. The sine wave power inverters 311 convert the DC voltage output from the storage batteries 310 to 120 volts AC. The multifunction power meter 148 monitors the solar panels charging current, battery output voltage (state of charge), and battery output current (rate of charge or discharge). The power outlets 150 are terminals, which allow 120 v AC, powered devices to access the output of the sine wave power inverters 311. The emergency off switches 160 are also integrated with the moisture sensors 146,147 on the roof of the umbrella and the top of the table 130 either of which, if activated, will safely stop the flow of current from the battery 310 immediately shutting down the system in the event of an emergency or unsafe levels of moisture is detected on or around the umbrella roof, tabletop, unit base station, or component storage areas. The battery charge controllers 312 maintain the proper charging voltage for the batteries 310. The batteries 310 store the energy provided by the solar panels 111,112. The control system 300 features 100 amp shunts 320 and 500 amp shunts 325 which allow electric current to pass around another point in the circuit. An unwanted short circuit causes the shunt to short out (becoming an antifuse) and become part of the circuit, again allowing electricity to pass. If the shunts burn out the power meter 148 will find the point of failure. Additionally, 30 amp fuses 326, 327 are features of the control system and act as overcurrent protection devices. The fuses 326, 327 essential components is a metal wire or strip that melts when too much current flows, which interrupts the circuit in which it is connected. The system is ground 328 by a conductor which connects all metal conduits and equipment enclosures to the service ground point. The conductor provides a low-impedance return path for leakage or fault currents in the extent of system failure or inadvertent contact of an energized conductor with an enclosure.

The table and umbrella apparatus can further comprise a satellite radio receiver on the umbrella in an alternative aspect of an embodiment of the invention. Furthermore, a wireless internet router may be positioned on the umbrella. The apparatus may also feature low energy lighting and a central small accessory charging station in an alternative embodiment.

The invention has been described in detail with particular reference to certain preferred embodiments thereof, but it will be understood that variations and modifications can be effected within the spirit and scope of the invention.

The invention claimed is:

1. A table and umbrella apparatus comprising:
an umbrella having at least one solar energy collection device that converts solar energy to an electrical DC voltage;
a pole that supports the umbrella, wherein the pole is connected to a table;
a base station connected to a bottom portion of the table comprising at least one battery that stores the electrical DC voltage and at least one inverter that converts the DC voltage to AC voltage;
moisture detection sensors on the table or umbrella that determines a moisture level, wherein the at least one inverter disconnects if the moisture level is an unsafe level;
and at least one power outlet terminal adapted to receive the AC voltage, wherein an electrical device may be plugged into the at least one power outlet terminal.

2. The table and umbrella apparatus of claim 1, wherein the base station further comprises a battery charge controller that ensures the at least one battery is continuously charging.

3. The table and umbrella apparatus of claim 1 further comprising a power meter display that indicates the at least one solar energy collection device charging current, or a state of a current charge, or a rate of the current charge or a current discharge.

4. A table and umbrella apparatus comprising:
an umbrella having at least one solar energy collection device on a top portion of the umbrella, wherein the at least one solar energy collection device converts solar energy to an electrical DC voltage;

a pole that supports the umbrella, wherein the pole is connected to a table;

a base station connected to a bottom portion of the table comprising at least one battery that stores the electrical DC voltage and at least one inverter that converts the DC voltage to AC voltage;

a moisture detector on the top portion of the umbrella that detects a moisture level of the apparatus;

at least one power outlet terminal adapted to receive the AC voltage, wherein if the moisture level is an unsafe level of moisture, a voltage current flow from the at least one inverter to the at least one power outlet terminal adapted to receive the AC voltage will immediately disconnect causing a power break in the output flow of the at least one battery.

5. The table and umbrella apparatus of claim 4 further comprising an emergency power switch that can disconnect the inverter from the apparatus in the event of an emergency.

6. The table and umbrella of claim 4 further comprising a power meter display that indicates the moisture level.

7. A method of providing power to an electrical device having an AC plug comprising:

providing a table having an umbrella supported by a pole, wherein the umbrella has at least one solar energy collection device;

collecting solar energy with the at least one solar energy collection device and converting the solar energy to an electrical DC voltage;

providing a base station connected to a bottom portion of the table comprising at least one battery that stores the electrical DC voltage and at least one inverter that converts the DC voltage to AC voltage;

providing at least one power outlet terminal on the pole;

supplying the AC voltage to the at least one power outlet terminal to power the electrical device;

providing a moisture detector that disconnects the least one inverter stopping the flow of power to the at least one power outlet terminal if the moisture level is an unsafe level.

8. The method of claim 7 further comprising providing an emergency power switch that can disconnect the inverter from the apparatus in the event of an emergency.

9. The table and umbrella apparatus of claim 1, wherein the moisture sensors comprise an adhesive tape with conductors.

10. The table and umbrella apparatus of claim 4, wherein the moisture detectors comprise an adhesive tape with conductors.

11. The method of claim 7, wherein the moisture detectors comprise an adhesive tape with conductors.

* * * * *